(12) United States Patent
Hari et al.

(10) Patent No.: US 12,009,754 B2
(45) Date of Patent: Jun. 11, 2024

(54) SWITCHING POWER CONVERTER WITH REDUCED VOLTAGE SWITCHING OF THE PRIMARY SWITCH

(71) Applicant: SEMICONDUCTOR COMPONENTS INDUSTRIES, LLC, Phoenix, AZ (US)

(72) Inventors: Ajay Karthik Hari, Scottsdale, AZ (US); Dhruv Chopra, Gilbert, AZ (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 208 days.

(21) Appl. No.: 17/449,680

(22) Filed: Oct. 1, 2021

(65) Prior Publication Data

US 2022/0109374 A1     Apr. 7, 2022

Related U.S. Application Data

(60) Provisional application No. 63/198,200, filed on Oct. 2, 2020.

(51) Int. Cl.
*H02M 3/335* (2006.01)
*H02M 1/088* (2006.01)
(Continued)

(52) U.S. Cl.
CPC ....... *H02M 3/33592* (2013.01); *H02M 1/088* (2013.01); *H02M 1/348* (2021.05);
(Continued)

(58) Field of Classification Search
CPC ............ H02M 3/22; H02M 3/24; H02M 3/28; H02M 3/315; H02M 3/335;
(Continued)

(56) References Cited

U.S. PATENT DOCUMENTS

2018/0294731 A1 * 10/2018 Song ................. H02M 3/33523
2019/0013739 A1    1/2019 Hari et al.

OTHER PUBLICATIONS

"Forced Frequency Resonant Flyback Controller"; Infineon Data Sheet XDPS21071; Oct. 30, 2019; 54 pages; Revision 2.0; Published by Infineon Technologies AG, Germany; Copyright 2019 Infineon Technologies AG.

(Continued)

*Primary Examiner* — Thienvu V Tran
*Assistant Examiner* — Carlos O Rivera-Perez
(74) *Attorney, Agent, or Firm* — Dickinson Wright PLLC; Mark E. Scott

(57) ABSTRACT

Reduced voltage switching of the primary switch. At least one example is a method comprising: activating, during a first switching period, a primary switch coupled to a primary winding of a transformer of a flyback topology, the activating induces a positive current in the primary winding; deactivating the primary switch and activating a secondary switch coupled to the secondary of the transformer, the activating the secondary switch during the first switching period and for a duration selected based on a signal indicative of negative current from a prior switching period, and the activating the secondary switch results in a positive current through the secondary winding followed by a negative current through the secondary winding; and discharging capacitance of the primary switch by a negative current in the primary winding responsive to the negative current in the secondary winding.

20 Claims, 11 Drawing Sheets

(51) Int. Cl.
*H02M 1/34* (2007.01)
*H02M 1/00* (2006.01)

(52) U.S. Cl.
CPC ...... *H02M 3/33507* (2013.01); *H02M 1/0009* (2021.05); *H02M 1/0058* (2021.05)

(58) Field of Classification Search
CPC ......... H02M 3/33507; H02M 3/33515; H02M 3/33523; H02M 3/3353; H02M 3/33538; H02M 3/33546; H02M 3/33553; H02M 3/33569; H02M 3/33576; H02M 3/33584; H02M 3/33592; H02M 1/0003; H02M 1/0009; H02M 1/0032; H02M 1/0035; H02M 1/0041; H02M 1/0048; H02M 1/0058; H02M 1/08; H02M 1/0083; H02M 1/088; H02M 1/32; H02M 1/34–348; H02M 1/38; H02M 1/385; Y02B 70/10
USPC ........... 363/15–21.18, 44–48, 74, 76–79, 89, 363/123–127; 323/235, 238, 266, 323/271–275, 282–287, 351
See application file for complete search history.

(56) References Cited

OTHER PUBLICATIONS

Zhang, Michael T., et al., "Design Considerations and Performance Evaluations of Synchronous Rectification in Flyback Converters"; IEEE Transactions on Power Electronics, vol. 13, No. 3, May 1998; Item No. 0885-8993/98; 9 pages; Copyright 1998 IEEE.

* cited by examiner

SWITCHING POWER CONVERTER WITH REDUCED VOLTAGE SWITCHING OF THE PRIMARY SWITCH

This application claims the benefit of U.S. Provisional App. No. 63/198,200 filed Oct. 2, 2020 titled "ZVS Flyback." The provisional application is incorporated by reference herein as if reproduced in full below.

BACKGROUND

An example power converter topology is the active clamp flyback power converter (ACF power converter). ACF power converters use a resonant or quasi-resonant primary circuit. ACF power converters utilize active clamp circuits on the primary side to achieve the resonant or quasi-resonant operation. More specifically, ACF power converts use a clamp circuit comprising a clamp field effect transistor (clamp FET) and a clamp capacitor. During certain operational modes, the current associated with the leakage inductance of the transformer flows to the clamp capacitor, and then the current resonantly reverses direction. The reverse current flow may be used to discharge parasitic capacitance of a primary FET to achieve reduced or zero voltage switching (ZVS), which decreases switching losses and thus increases overall efficiency of the ACF power converter.

While ZVS increases efficiency, using an active clamp circuit to achieve ZVS increases component count and cost of the ACF power converter, and also increases the complexity and cost of the controller used to operate the ACF power converter.

SUMMARY

At least one example is a method of operation a switching power converter, comprising: activating, during a first switching period, a primary switch coupled to a primary winding of a transformer of a flyback topology, the activating induces a positive current in the primary winding; deactivating the primary switch and activating a secondary switch coupled to the secondary of the transformer, the activating the secondary switch during the first switching period and for a duration selected based on a signal indicative of negative current from a prior switching period, and the activating the secondary switch results in a positive current through the secondary winding followed by a negative current through the secondary winding; discharging capacitance of the primary switch by a negative current in the primary winding responsive to the negative current in the secondary winding; and then activating the primary switch during a second switching period subsequent to the first switching period.

In the example method, the duration may be shorter than a prior duration in the prior switching period if the signal indicative of negative current indicates an excess negative current. In the example method, the duration of the first switching period may be shorter than the prior duration results in increasing a switching frequency. In the example method, the duration may be shorter than the prior duration in the prior switching period by at least one selected from a group consisting of: an amount proportional to the excess negative current; and a predetermined amount.

In the example method, the duration may be longer than a prior duration in the prior switching period if the signal indicative of negative current indicates an insufficient negative current.

The example method may further comprise, during the activation of the secondary switch, flowing positive current in the primary winding only through a diode to a clamp capacitor, the positive current in the primary winding during the activation of the secondary switch attributable to leakage inductance of the transformer.

In the example method, the signal indicative of negative current may be at least one selected from a group consisting of: a voltage of a switch node between the primary winding and the primary switch; a voltage across an auxiliary winding of the transformer; and a voltage of a monitor node between the secondary winding and the secondary switch.

Another example is a controller for a switching power converter, the controller comprising: a primary-drive terminal, a secondary-drive terminal, a sense terminal, and a feedback terminal; a primary controller coupled to the primary-drive terminal and the feedback terminal, the primary controller configured to assert the primary-drive terminal in a charge mode of a first switching period; a secondary controller coupled to the secondary-drive terminal, the secondary controller configured to assert the secondary-drive terminal during a discharge mode in the first switching period; and a modulation controller. The modulation controller may be configured to: sense a signal indicative of negative current flow by way of the sense terminal during the first switching period; and adjust a duration of assertion of the secondary-drive terminal during a second switching period subsequent to the first switching period, the adjustment responsive to the signal indicative of negative current flow during the first switching period.

In the example controller, when the modulation controller adjusts the duration of assertion, the modulation controller may be further configured to make the duration of assertion shorter than a duration of assertion during the first switching period if the signal indicative of negative current flow indicates an excess negative current. The duration of assertion during the second switching period may be shorter than the duration of assertion during the first switching period results in increasing a switching frequency.

In the example controller, when the modulation controller adjusts the duration of assertion, the modulation controller may be further configured to make the duration of assertion longer than a duration of assertion during the first switching period if the signal indicative of negative current flow indicates an insufficient negative current. The duration of assertion during the second switching period may be longer than the duration of assertion during the first switching period results in decreasing a switching frequency.

In some cases, the example controller does not control a clamp switch of a clamp circuit of the switching power converter.

Yet another example is a switching power converter comprising: a primary circuit; a secondary circuit; and a controller. The primary circuit may comprise: a primary winding of a transformer, the primary winding having a first terminal coupled to an input node, and a second terminal defining a switch node; a primary FET coupled between the switch node and a ground or common of the primary circuit; and a clamp diode in series with a clamp capacitor, the clamp diode and clamp capacitor coupled between the input node and the switch node. The secondary circuit may comprise: a secondary winding of the transformer arranged for flyback operation; and a secondary FET coupled between a terminal of the secondary winding and ground or common of the secondary circuit. The controller may define a main drive output coupled to a gate of the primary FET, a second drive output coupled to a gate of the secondary FET, and a sense input coupled to a signal indicative of voltage at the switch node. And the controller may be configured to: assert a gate of the primary FET during a charge mode of a first switching period; and then assert a gate of the secondary FET during a discharge mode of the first switching period; sense a signal indicative of negative current flow by way of the sense input during the first switching period; and adjust a duration of assertion of the gate of the secondary FET during a discharge mode of a second switching period subsequent to the first switching period, the adjustment responsive to the signal indicative of negative current flow during the first switching period.

In the example power converter, when the controller adjusts the duration of assertion, the controller may be further configured to make the duration of assertion shorter than a duration of assertion during the first switching period if the signal indicative of negative current flow indicates an excess negative current. The duration of assertion during the second switching period may be shorter than the duration of assertion during the first switching period results in increasing a switching frequency In the example power converter, when the controller adjusts the duration of assertion, the controller may be further configured to make the duration of assertion longer than a duration of assertion during the first switching period if the signal indicative of negative current flow indicates an insufficient negative current. The duration of assertion during the second switching period being longer than the duration of assertion during the first switching period results in decreasing a switching frequency. The controller may make the duration of assertion during the second switching period longer by at least one selected from a group consisting of: an amount proportional to the insufficient negative current; and a predetermined amount.

In the example power converter, the controller may not control a clamp switch of a clamp circuit of the switching power converter.

BRIEF DESCRIPTION OF THE DRAWINGS

For a detailed description of example embodiments, reference will now be made to the accompanying drawings in which.

DEFINITIONS

Figure 1:
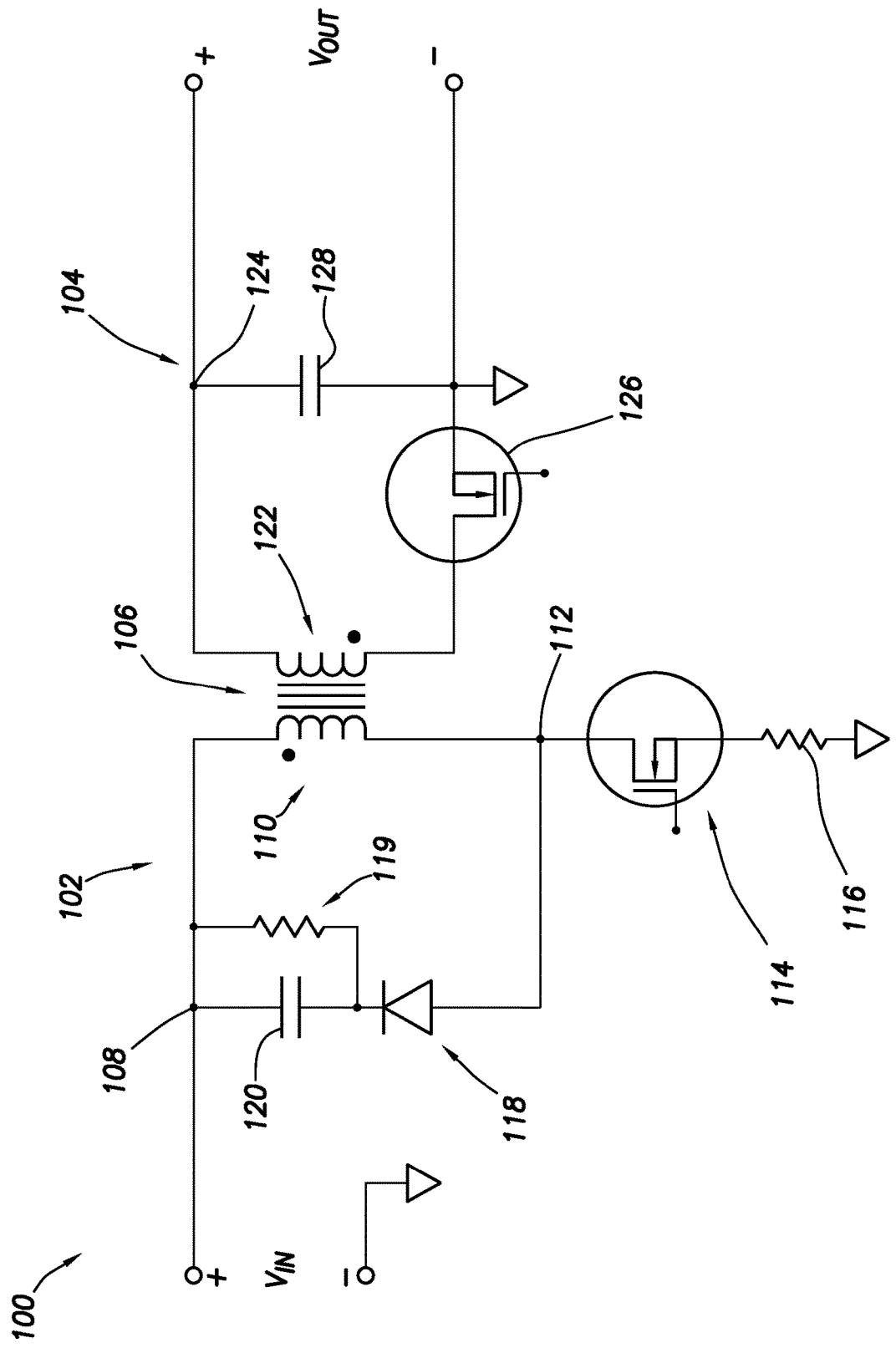
FIG. 1 shows a simplified schematic diagram of a flyback power converter in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terms "input" and "output" when used as nouns refer to connections (e.g., electrical, software), and shall not be read as verbs requiring action. For example, a timer circuit may define a clock output. The example timer circuit may create or drive a clock signal on the clock output. In systems implemented directly in hardware (e.g., on a semiconductor substrate), these "inputs" and "outputs" define electrical connections. In systems implemented in software, these "inputs" and "outputs" define parameters read by or written by, respectively, the instructions implementing the function.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), or a field programmable gate array (FPGA), configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to switching power converters with reduced voltage switching of the primary switch. More particularly, various examples are directed to switching power converters with transformers arranged for flyback operation, and where reduced switching of the primary switch (e.g., zero voltage switching (ZVS)) is achieved by enabling reverse or negative current in the secondary winding during the discharge mode. The negative current results in a reverse or negative current in the primary winding during an immediately subsequent charge mode, and the negative current is used to drain or discharge the parasitic capacitance associated with the primary switch. More particularly still, various examples are directed to sensing a signal indicative of negative current in a first switching cycle, and adjusting a magnitude of negative current in the secondary winding during a subsequent switching cycle. The specification first turns to an example flyback power converter, and its operation, to orient the reader.

FIG. 1 shows a simplified schematic diagram of a power converter in accordance with at least some embodiments. In particular, the power converter 100 comprises a primary circuit 102 electrically coupled to a secondary circuit 104 by way of a transformer 106. The primary circuit 102 defines a node 108 that is coupled to a direct current (DC) input voltage VIN. In the example system the node 108 is also coupled directly to a first lead of a primary winding 110 of the transformer 106. The second lead of the primary winding 110 is coupled to a switch node 112. The switch node 112 (and thus the second lead of the primary winding 110) is coupled to an electrically-controlled switch illustratively shown as a field effect transistor (hereafter primary FET 114). In particular, the drain of the primary FET 114 is coupled to the switch node 112. The source of the primary FET 114 is coupled to common or ground by way of an optional sense resistor 116. In the example system the primary FET 114 is N-channel metal oxide semiconductor (MOS) FET. However, in other example cases the primary FET 114 may be a P-channel MOSFETs, or any other suitable device that operates as an electrically controlled switch, including FETs referred to as "super-junction" (SJFETs), and higher performance gallium nitride (GaN) FETs.

The switch node 112 also couples to an anode of a clamp diode 118. The cathode of the clamp diode 118 is coupled to one lead of a clamp capacitor 120, and the second lead of the clamp capacitor 120 is coupled to the node 108. In other cases, the second lead of the clamp capacitor 120 may be referenced to common or ground of the primary circuit 102. The clamp diode 118 and clamp capacitor 120 may be collectively referred to as a snubber circuit or a clamp circuit. Because the example clamp circuit is implemented using the clamp diode 118 rather than an electrically-controlled switch, the clamp circuit may be referred to as a passive-clamp circuit. In order to dissipate energy stored on the clamp capacitor 120, a resistor 119 may be coupled in parallel with the clamp capacitor 120.

Still referring to FIG. 1, the example secondary circuit 104 comprises a secondary winding 122 of the transformer 106. A first lead of the secondary winding 122 is coupled to an output node 124 of the secondary circuit 104 and thus the positive terminal of an output voltage VOUT. The second lead of the secondary winding 122 is coupled to a rectifier in the example form an electrically-controlled switch illustratively shown as a FET (hereafter secondary FET 126). In particular, the second lead of the secondary winding 122 is coupled to the drain of secondary FET 126, and the source of secondary FET 126 is coupled to common or ground for the secondary circuit 104. The secondary circuit 104 also comprises a capacitor 128 coupled between the output node 124 and common or ground for the secondary circuit 104 (which need not be the same as the common or ground for the primary circuit 102 because of the isolation aspects of the transformer 106). The transformer 106 is arranged for flyback operation. The specification now turns to various operational states or modes of the power converter 100.

Figure 2A:
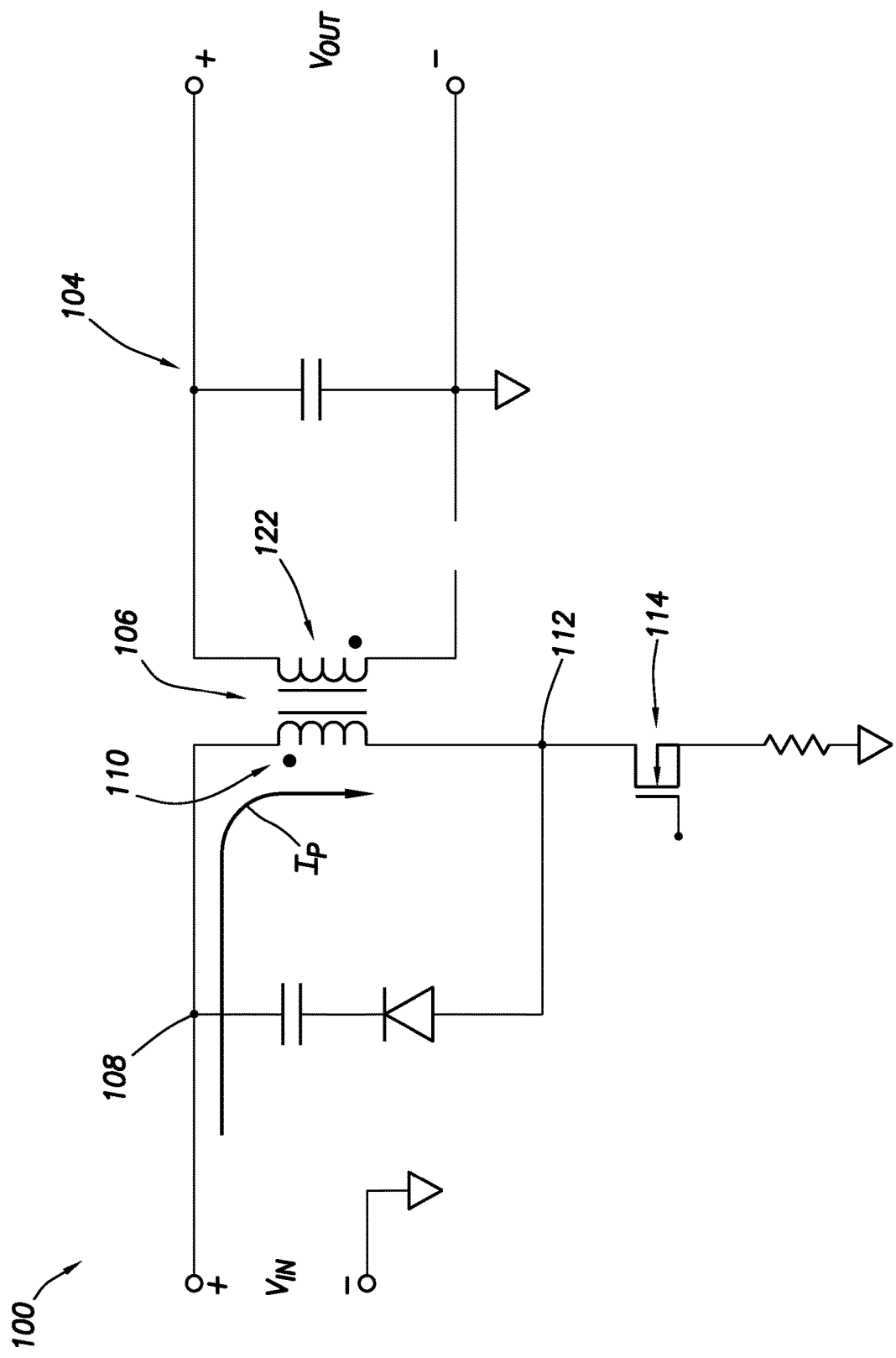
FIG. 2A shows a schematic diagram of a charge mode of the power converter in accordance with at least some embodiments.

FIG. 2A shows a schematic diagram of a first mode of operation of the example power converter 100. In particular, the FETs that are conductive are present in the figure, and the FETs that are non-conductive are removed to show an open circuit. During the first mode, sometimes referred to as the energy storage mode or the charge mode, the primary FET 114 is conductive, and thus current $I_P$ flows from the input voltage VIN, through node 108, through the primary winding 110, through the switch node 112, and through the primary FET 114 to common or ground. The current $I_P$ flowing in the direction shown through the primary winding 110 is referred to as positive current. The positive current $I_P$ creates a voltage on the secondary winding 122 that reverse biases the non-conductive rectifier in the secondary circuit 104. Thus, the positive current $I_P$ stores energy in the field of the transformer 106. At some point, the charge mode ends by deactivating the primary FET 114, as shown in FIG. 2B.

Figure 2B:
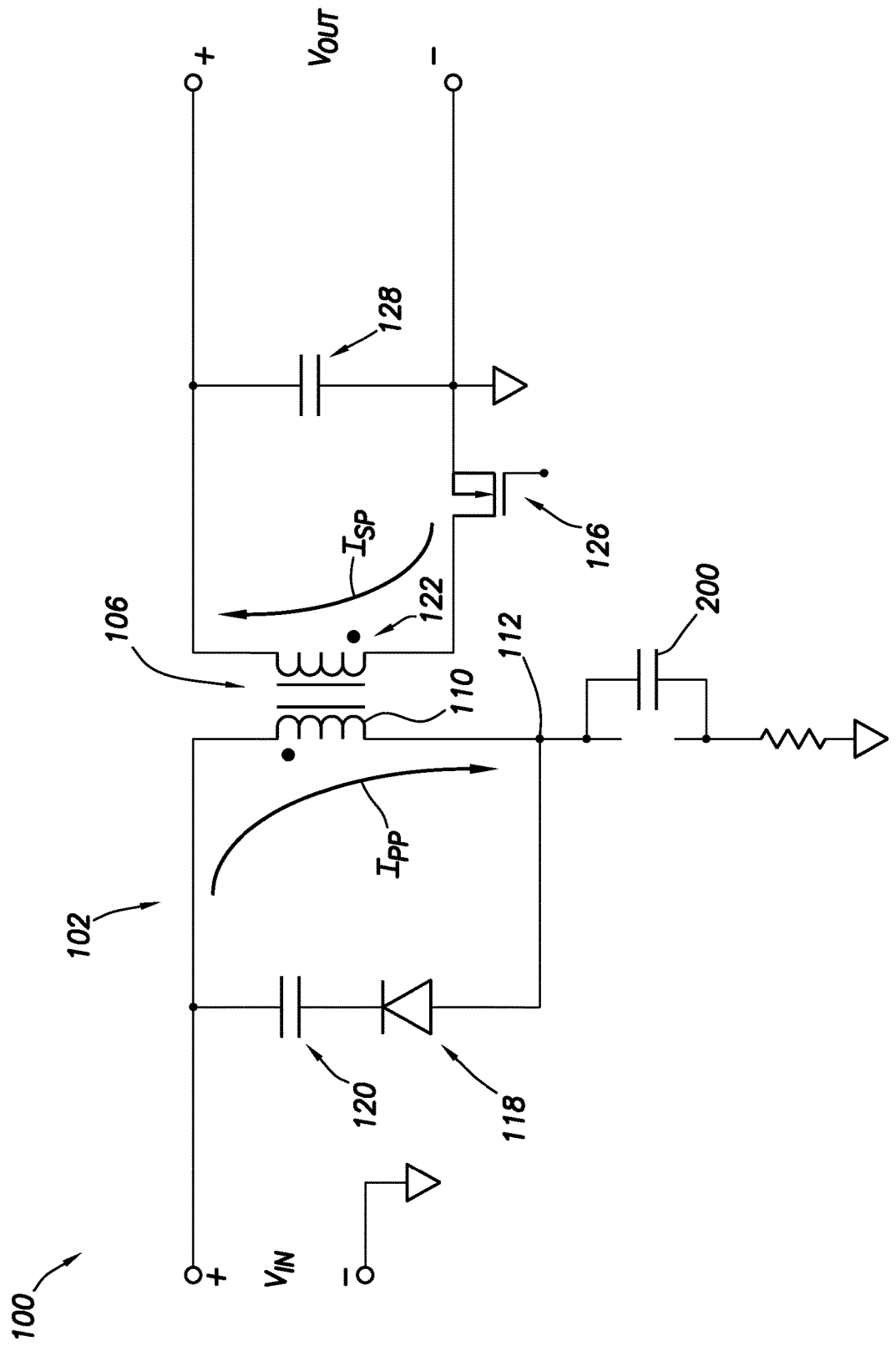
FIG. 2B shows a schematic diagram of a first portion of a discharge mode of the power converter in accordance with at least some embodiments.

FIG. 2B shows a schematic diagram of a second mode of operation of the example power converter 100. As before, the FETs that are conductive are shown in the figure, and FETs that are non-conductive are removed to show an open circuit. Also shown in FIG. 2B is a capacitor 200 representative of the parasitic capacitance of the primary FET 114 (now shown). During the second mode, sometimes referred to as the flyback mode or the discharge mode, the primary FET 114 (not shown) is non-conductive. Because of the leakage inductance of the transformer 106, the positive current from the charge mode cannot stop immediately when the primary FET 114 is made non-conductive, and thus a positive current $I_{PP}$ continues to flow in the primary circuit 102 to the switch node 112. A portion of the positive current $I_{PP}$ flows through the clamp diode 118 to the clamp capacitor 120. Another portion of the positive current $I_{PP}$ flows to and charges the parasitic capacitance of the primary FET 114 shown by capacitor 200. At the same time, the energy stored in the field of the transformer 106 collapses, which creates a voltage on the secondary winding 122 that forward biases the rectifier in the secondary circuit 104. Based on being forward biased, the secondary FET 126 is made conductive and a positive secondary current $I_{SP}$ flows in the secondary circuit 104 as shown, providing the output voltage VOUT.

In related-art power converters, just as the field of the transformer fully collapses and the positive secondary current $I_{SP}$ reaches zero, the secondary FET is made non-conductive to ensure the current through the secondary winding 122 does not reverse direction. That is, just prior to the secondary current reaching zero, the secondary FET is made non-conductive to ensure that the voltage on the capacitor 128 does not create a negative current through the secondary winding 122, the negative current opposite of the positive secondary current $I_{SP}$. However, in accordance with example systems and methods, the secondary FET 126 remains conductive after the positive secondary current $I_{SP}$ reaches zero, which enables a negative secondary current.

Figure 2C:
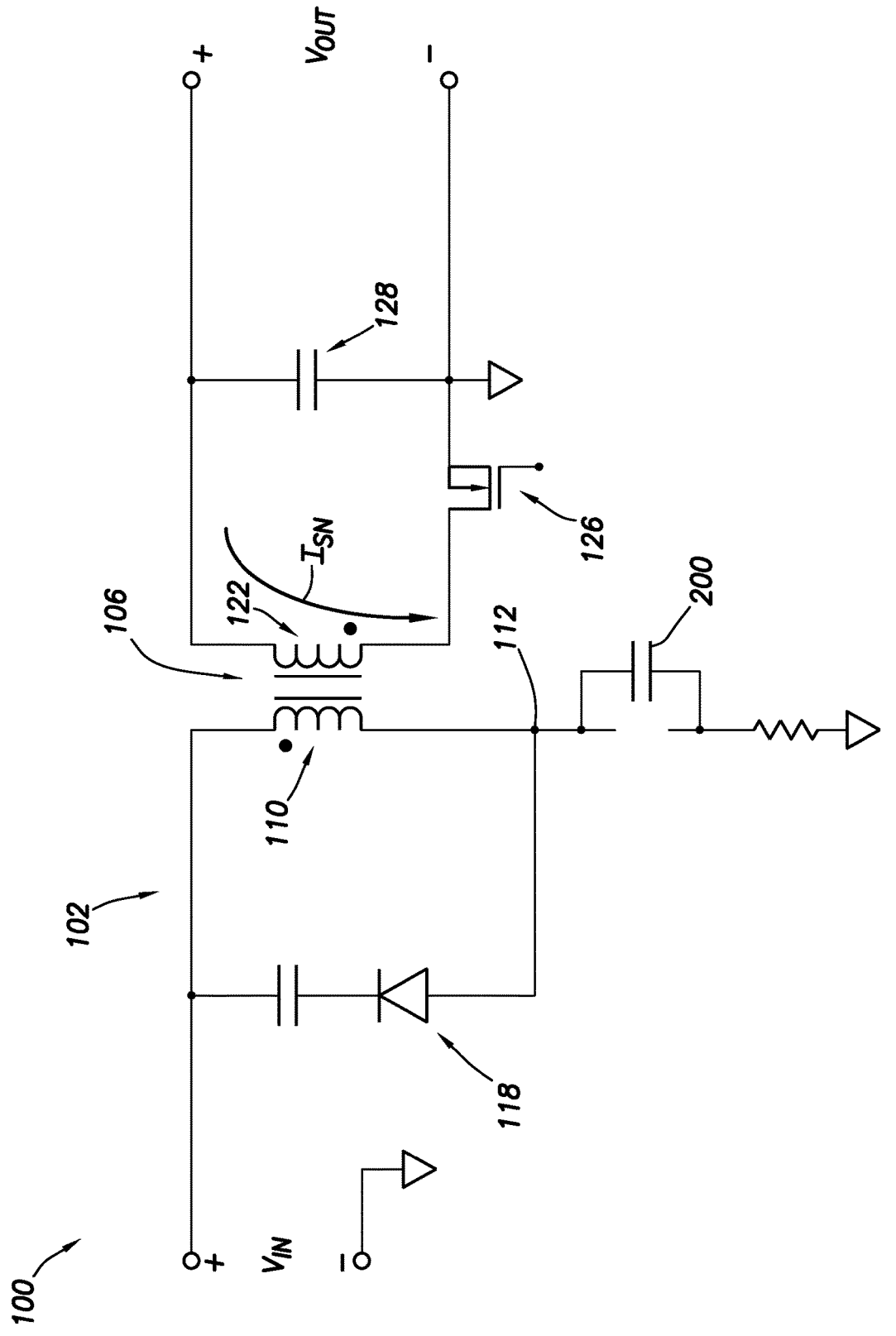
FIG. 2C shows a schematic diagram of a second portion of the discharge mode of the power converter in accordance with at least some embodiments.

FIG. 2C shows a schematic diagram of the continued discharge mode of the example power converter 100. In particular, in the situation of FIG. 2C the field associated with the prior charge mode of transformer 106 has fully collapsed. Because the secondary FET 126 remains conductive, a reverse or negative current flows through the secondary winding 122, shown as negative secondary current $I_{SN}$. The longer the duration of the conductive state of the secondary FET 126 as the negative secondary current flows, the greater the peak magnitude of the negative secondary current $I_{SN}$. The negative secondary current $I_{SN}$ induces a voltage on the primary winding 110, which in accordance with the flyback arrangement creates a higher voltage on the switch node 112 (in conformance with the dot convention associated with the transformer 106). However, because the primary FET 114 is non-conductive, and further because the clamp capacitor 120 and the parasitic capacitance shown by capacitor 200 were charged because of the primary current attributable to the leakage inductance of the transformer 106, very little or no current flows in the primary winding 110 during the period of time that the negative secondary current $I_{SN}$ flows. Thus, the energy provided to the secondary winding 122 by the negative secondary current $I_{SN}$ again stores energy in the field of the transformer 106. Thereafter, the secondary rectifier 126 is made non-conductive.

Figure 2D:
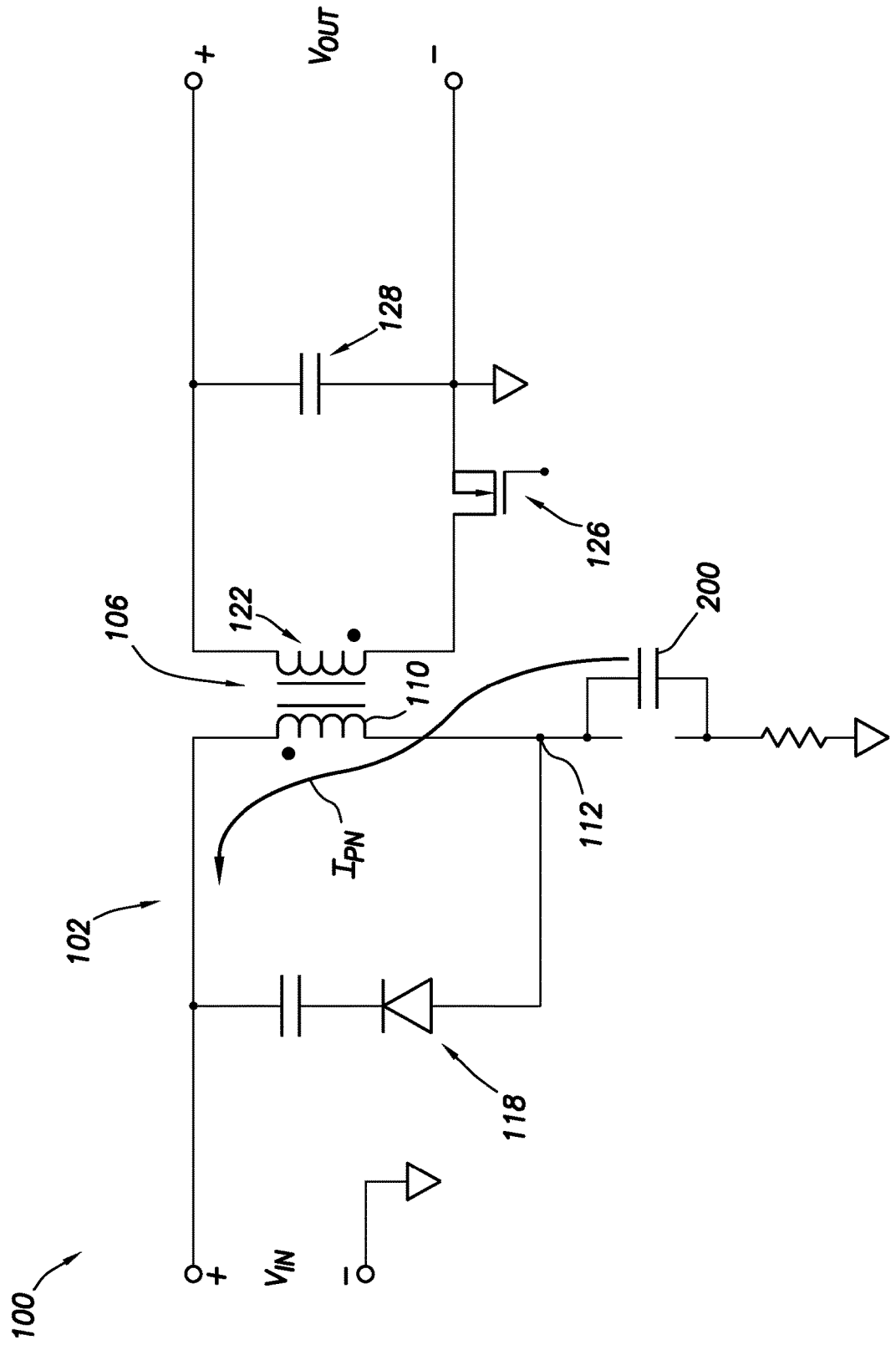
FIG. 2D shows a schematic diagram of a third portion of the discharge mode of the power converter in accordance with at least some embodiments.

As soon as the secondary FET 126 becomes non-conductive, the voltage induced on the primary winding 110 reverses. The energy stored in the field of the transformer 106 again collapses causing a negative current through the primary winding 110. FIG. 2D shows a schematic diagram of the continued discharge mode of the example power converter 100. In particular, the collapsing field of the transformer 106 induces a negative current $I_{PN}$ on the primary winding 110 tending to discharge the parasitic capacitance of the primary FET 114 (not shown) shown by capacitor 200. Thus, by inducing negative current in the secondary winding at the end of the discharge mode, the ZVS may be achieved even in the absence of a FET to control the snubber action. Stated slightly differently, ZVS may be achieved in the primary circuit 102 in spite of having only one electrically-controlled switch (i.e., the primary FET) in the primary circuit 102.

Figure 3:
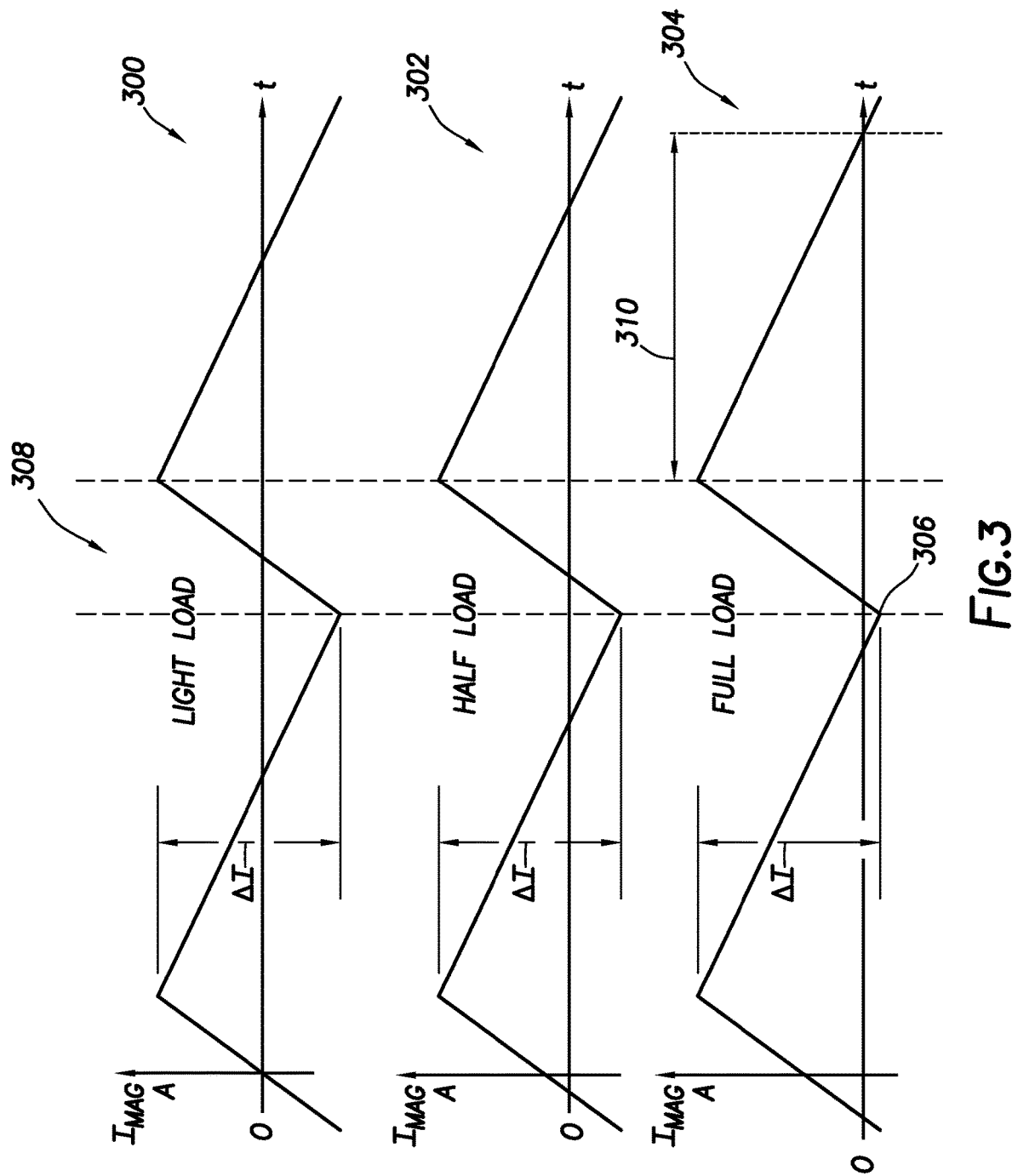
FIG. 3 shows a set of plots of magnetizing current as a function of time in accordance with at least some embodiments.

FIG. 3 shows a set of plots of magnetizing current as a function of time. In particular, plot 300 shows the magnetizing current in light-load conditions. Plot 302 shows the magnetizing current in half-load conditions. And plot 304 shows the magnetizing current in full-load conditions. Starting with the full-load plot 304. As discussed above, in accordance with the various examples the power converter 100 (FIG. 1) is controlled such that the current through the primary winding 110 becomes negative which discharges parasitic capacitances in the primary circuit 102, such as the parasitic capacitance represented by capacitor 200 (FIG. 2B). The negative current is shown in the full-load plot 304 as the small triangular region 306. Once the parasitic capacitance is discharged, the power converter 100 enters the charge mode by making the primary FET 114 conductive (FIG. 1, and FIG. 2A). For a particular clock frequency that defines timing within the power converter 100, in a steady-state condition the particular clock frequency enables sufficient negative current to flow in the secondary circuit 104, and thus sufficient negative current to flow in the primary circuit 102, to discharge the parasitic capacitances within the primary circuit 102 to ensure ZVS of the primary FET 114.

However, as shown with respect to the light-load plot 300 and the half-load plot 302, that same particular clock frequency results in relative constant peak-to-peak current flow in the primary circuit 102 (shown by ΔI in the plots). While the constant ΔI current may result ZVS at full load, the same particular clock frequency and constant ΔI current results in excessive negative current at light load and half load. The excessive negative current decreases efficiency of the power converter by increasing conduction and core losses.

In example cases, the power converter 100 regulates negative current flow through the primary winding 110 (or equivalently stated, through the switch node 112). More particularly, the example power converter 100 changes the switching frequency responsive to negative current through the primary winding 110. For example, if the negative current is too high, the switching frequency is increased which decreases the duration of the discharge mode. And if the negative current is too low (e.g., such that ZVS cannot take place), the switching frequency is decreased which increases the duration of the discharge mode.

Figure 4:
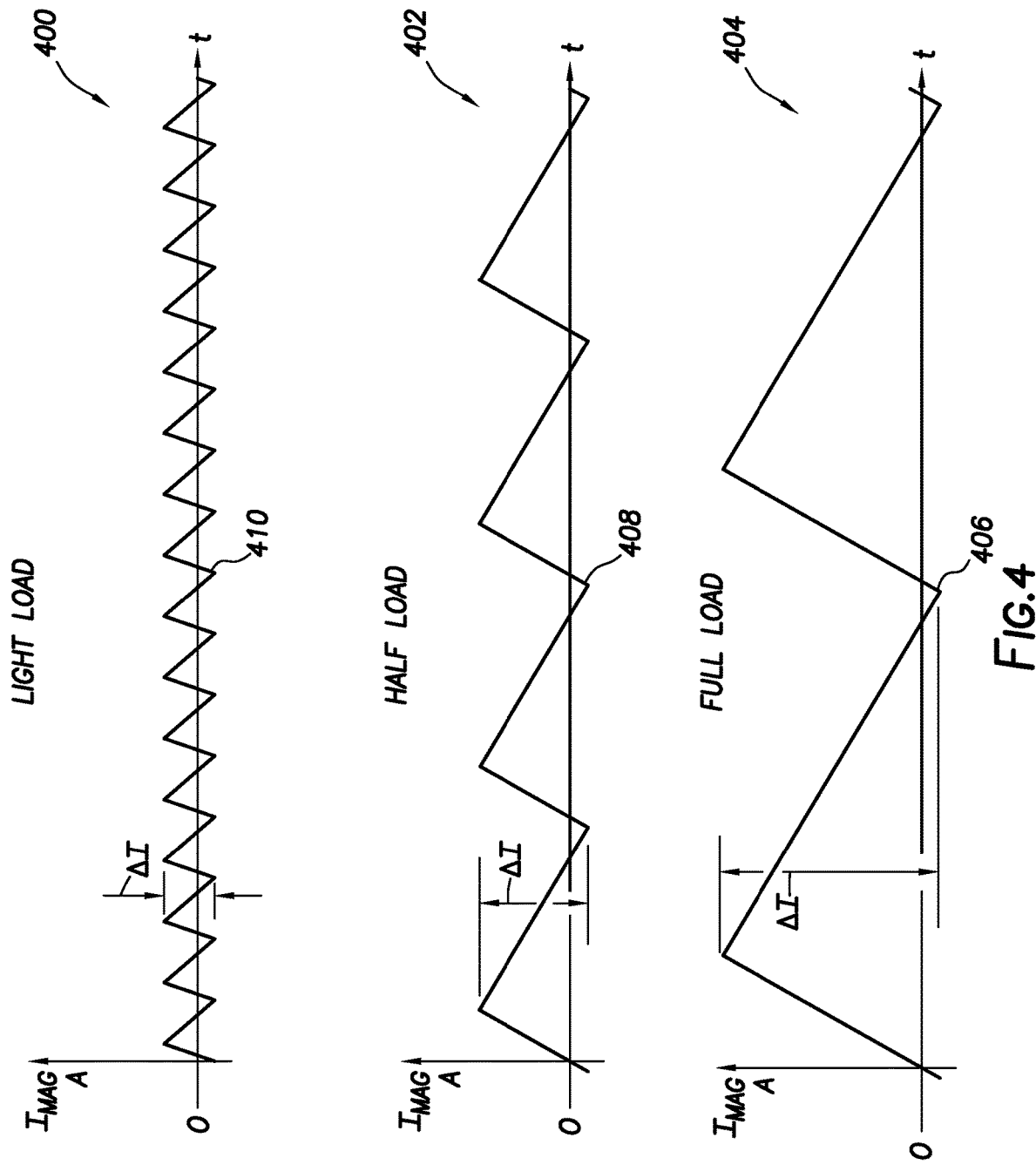
FIG. 4 shows a set of plots of magnetizing current as a function of time in accordance with at least some embodiments.

FIG. 4 shows a set of plots of magnetizing current as a function of time. In particular, plot 400 shows the magnetizing current in light-load conditions. Plot 402 shows the magnetizing current in half-load conditions. And plot 404 shows the magnetizing current in full-load conditions. Starting with the full-load plot 404, as discussed above, the negative current in the primary circuit 102 is shown in the full-load plot 404 as the small triangular region 406. As the load decreases, the clock frequency increases and thus the duration of each charge and discharge mode decreases. A shorter duration of the discharge mode results in less negative current in the secondary winding 122. Referring to the half-load plot 402, the negative current is shown in the half-load plot 402 as the small triangular region 408. In steady-state operation, the peak negative current represented by the triangular region 408 is about the same as the peak negative current represented by triangular region 406. Moving between full load and half load, the switching frequency is increased resulting in the duration of the discharge mode being shortened and thus less negative current through the secondary winding 122. As the load further decreases, the switching frequency continues to increase. Referring to the light-load plot 400, the negative current is shown in the light-load plot 400 as the small triangular region 410. In steady-state operation, the peak negative current represented by the triangular region 410 is about the same as the peak negative current represented by triangular region 408 and triangular region 406. Stated with respect to opposite loading changes, as the load increases from light loads to heavy loads, the switching frequency decreases and the duration of each charge and discharge mode increases resulting in more negative current through the secondary winding 122.

Figure 5:
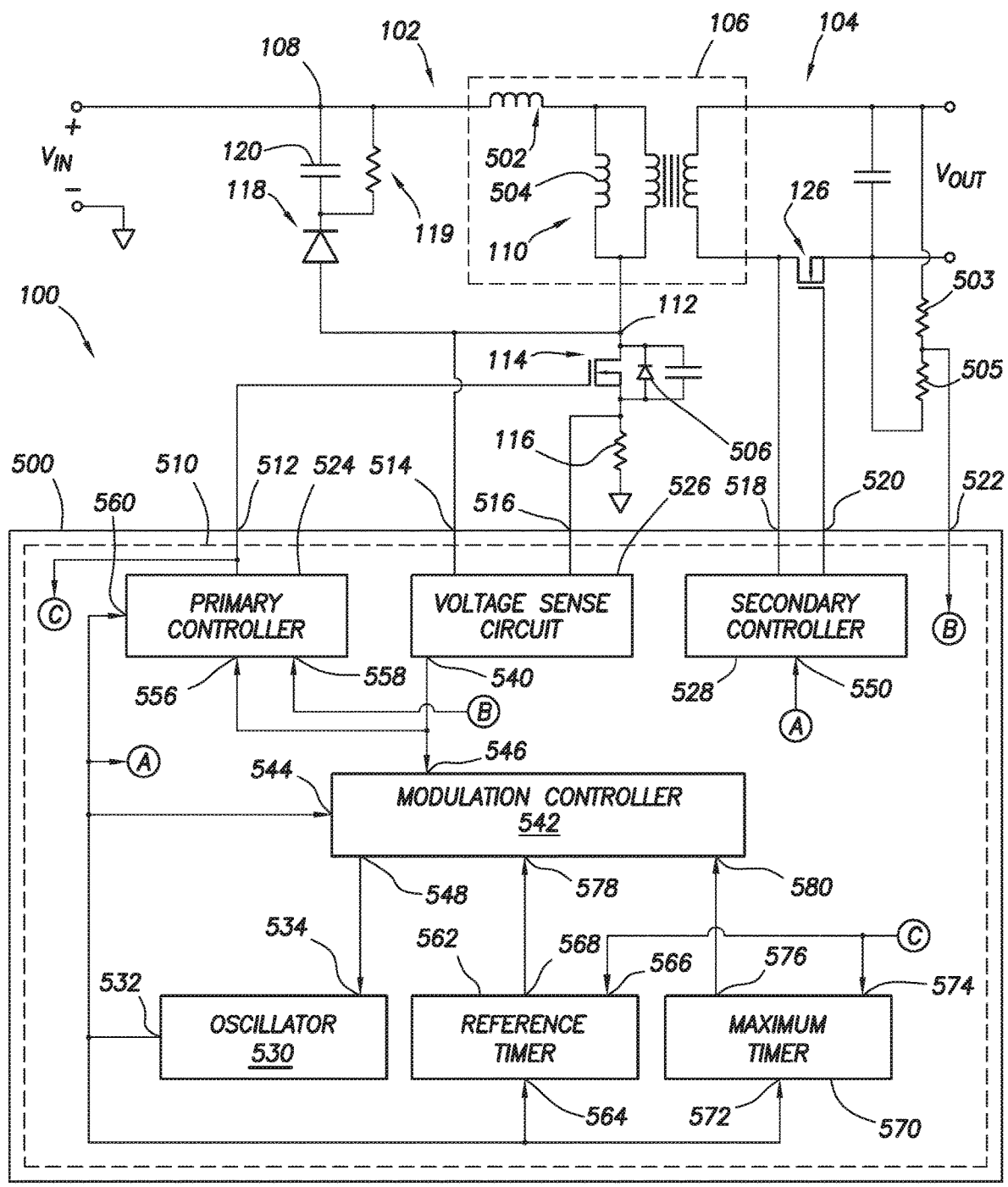
FIG. 5 shows a more detailed schematic of a power converter, including a block diagram of a controller, in accordance with at least some embodiments.

FIG. 5 shows a more detailed schematic of a power converter 100, including a block diagram of a controller 500, in accordance with at least some embodiments. In particular, the power converter 100 comprises the primary circuit 102 coupled to the secondary circuit 104 by way of the transformer 106. The transformer 106 is shown in a model or equivalent circuit form where the primary winding 110 is modelled as a leakage inductance 502 in series with a magnetizing inductance 504, and the magnetizing inductance 504 is in parallel with the primary winding of an ideal (lossless) transformer. As before, one lead of the primary winding 110 of the transformer 106 is coupled to the node 108, and the second lead of the primary winding 110 is coupled to the switch node 112. The primary FET 114, clamp diode 118, clamp capacitor 120, and resistor 119 are coupled as discussed with respect to the previous figures. Also shown in FIG. 5 is the body diode 506 of the primary FET 114 along with parasitic capacitance of the primary FET 114 shown as capacitor 200.

The example secondary circuit 104 comprises the secondary FET 126 associated with the secondary winding. Additionally, the example secondary circuit 104 comprises a voltage divider comprising resistor 503 and resistor 505 coupled in series between the output voltage VOUT and the ground or common in the secondary circuit 104. The node between resistors 503 and 505 thus generates a scaled version of the output voltage VOUT.

FIG. 5 further shows a block diagram of an example controller 500. In particular, the controller 500 may comprise electrical devices and circuits monolithically created on a substrate 510 and encapsulated within packaging; however, the functionality of the various components may be embodied on multiple substrates that are co-packaged (e.g., multi-chip module) and coupled to each other and the various terminals. While the controller 500 is shown as a single packaged semiconductor device, in other cases the functionality of the controller 500 may be implemented in a set of packaged semiconductor devices (e.g., two) that work together to implement the functionality. The example controller 500 defines a primary-gate terminal 512, a voltage-sense terminal 514, a current-sense terminal 516, a drain-sense terminal 518, a secondary-gate terminal 520, and a feedback terminal 522. The example terminals are electrical connections exposed and accessible through the packaging. Additional terminals will be present (e.g., power terminal, reference voltage terminal, ground terminal), but those additional terminals are not shown so as not to unduly complicate the figure. The functionality of the controller 500 may be conceptually, though not necessarily physically, divided into a primary controller 524, a voltage sense circuit 526, a secondary controller 528, an oscillator 530, a modulation controller 542, a reference timer 562, and a maximum timer 570. Each will be addressed, starting with the voltage sense circuit 526.

The voltage sense circuit 526 defines a voltage-sense input coupled to the voltage-sense terminal 514 and thus the switch node 112, where voltage on the switch node 112 is a signal indicative of current flow through the primary winding 110. The example voltage sense circuit 526 also comprises an optional current-sense input coupled to the current-sense terminal 516 and thus node between the source of the primary FET 114 and the sense resistor 116. At certain points in time (e.g., when the voltage on the switch node 112 is negative and thus the body diode 506 is forward biased), the voltage at the node between the primary FET 114 and the sense resistor 116 is also a signal indicative of current flow. The example voltage sense circuit 526 defines a sense output 540. The voltage sense circuit 526 is designed and constructed to sense a signal indicative of current flow by way of the voltage-sense terminal 514 and/or the current-sense terminal 516. Responsive to the sensing, the example voltage sense circuit 526 generates, on the sense output 540, a sense signal that is indicative of voltage at the switch node 112 during the discharge mode, which is indicative of current through the primary winding. In yet still other cases, the voltage-sense terminal 514 may be coupled to an auxiliary winding (not specifically shown) of the transformer 106 that reflects the voltage at the switch node 112 during discharge modes, and thus the signal indicative of current flow may be derived from the auxiliary winding of the transformer.

Still referring to FIG. 5, the controller 500 further includes the oscillator 530, and the oscillator 530 defines a clock output 532 and a modulate input 534. The oscillator 530 is designed and constructed to generate a clock signal at a clock frequency on the clock output 532, where the clock frequency is based on the modulate signal received on the modulate input 534.

The example controller 500 further comprises the modulation controller 542. The modulation controller 542 defines a clock input 544 coupled to the clock output 532 and thus the clock signal, a sense input 546 coupled to the sense output 540, and a modulate output 548 coupled to the modulate input 534 of the oscillator 530. Discussion of operation of the modulation controller 542 continues after introduction of the remaining components of the controller 500.

The example controller 500 further comprises the secondary controller 528. The secondary controller 528 defines a drain-sense input coupled to the drain-sense terminal 518 and thus the drain of the secondary FET 126, a gate output coupled to the secondary-gate terminal 520 and thus gate of the secondary FET 126, and a clock input 550 coupled to the clock output 532 and thus the clock signal. In one example, the secondary controller 528 is configured to monitor the drain of the secondary FET 126 by way of the drain-sense terminal 518, and assert the gate of the secondary FET 126 at the beginning of each discharge mode. That is, during each charge mode the voltage at the drain of the secondary FET is negative in accordance with the flyback arrangement. As soon as the discharge mode begins (e.g., the primary FET 114 is made non-conductive), the voltage at the drain of the secondary FET 126 becomes positive (e.g., a forward voltage drop of the body diode (not shown)). When the positive voltage at the drain of the secondary FET 126 is sensed, the secondary controller 528 may assert the gate of the secondary FET 126, thus making the secondary FET 126 conductive. In other cases, the connection to the drain of the secondary FET 126 may be omitted, and in such cases secondary controller 528 may make the secondary FET 126 conductive responsive to the state of the clock signal. In other cases, the secondary controller 528 may define a input coupled to the modulation controller 542, and in those cases the modulation controller 542 may command the secondary controller 528 to make the secondary FET 126 non-conductive by asserting the input.

In example systems, the secondary controller 528 maintains the secondary FET 126 in the conductive state while the field of the transformer 106 collapses and positive current flows through the secondary winding (e.g., FIG. 2B). Further, the example secondary controller 528 keeps the secondary rectifier 126 conductive in spite of demagnetization of the transformer 106 which thus enables negative current flow through the secondary winding (e.g., FIG. 2C). In particular, the secondary controller 528 may maintain the secondary FET 126 in the conductive state to enable the negative current in the secondary winding, which thus creates a negative current in the primary winding used to discharge the parasitic capacitance of the primary FET 114 (e.g., FIG. 2D) for purposes of attempting to achieve ZVS of the primary FET 114 and to begin an immediately subsequent charge mode. The timing of making the secondary FET 126 non-conductive by the secondary controller 528 may be based the clock signal received on the clock input 550 from the oscillator 530, as discussed more below.

The example controller 500 further comprises the primary controller 524. The primary controller 524 defines a sense input 556 coupled to the sense output 540, a feedback input 558 coupled to the feedback terminal 522, a primary-drive drive output coupled to the primary-gate terminal 512 and thus the gate of the primary FET 114, and a clock input 560 coupled to the clock output 532. The primary controller 524 thus receives the clock signal, the sense signal, and a signal indicative of output voltage VOUT. In accordance various examples, the primary controller 524 is designed and constructed to assert the gate of the primary FET 114 responsive to the clock signal and the sense signal on the sense input 556. The primary controller 524 may also be configured to de-assert the gate of the primary FET 114 based on signal indicative of output voltage VOUT. In other cases, the peak current in each charge mode may be controlled by the clock frequency of the clock signal of the power converter 100.

Returning to the modulation controller 542. The example modulation controller 542 is designed and constructed monitor the sense signal received on the sense input 546. Moreover, the modulation controller 542 is configured to regulate the clock frequency of the clock signal by changing or adjusting the modulate signal driven to the modulate output 548 based on the sense signal. For example, the modulation controller 542 is configured to increase the frequency of the clock signal generated by the oscillator 530 if the sense signal indicates excess negative current. Conversely, the modulation controller 542 is configured to decrease the frequency of the clock signal generated by the oscillator 530 if the sense signal indicates insufficient negative current.

Figure 6:
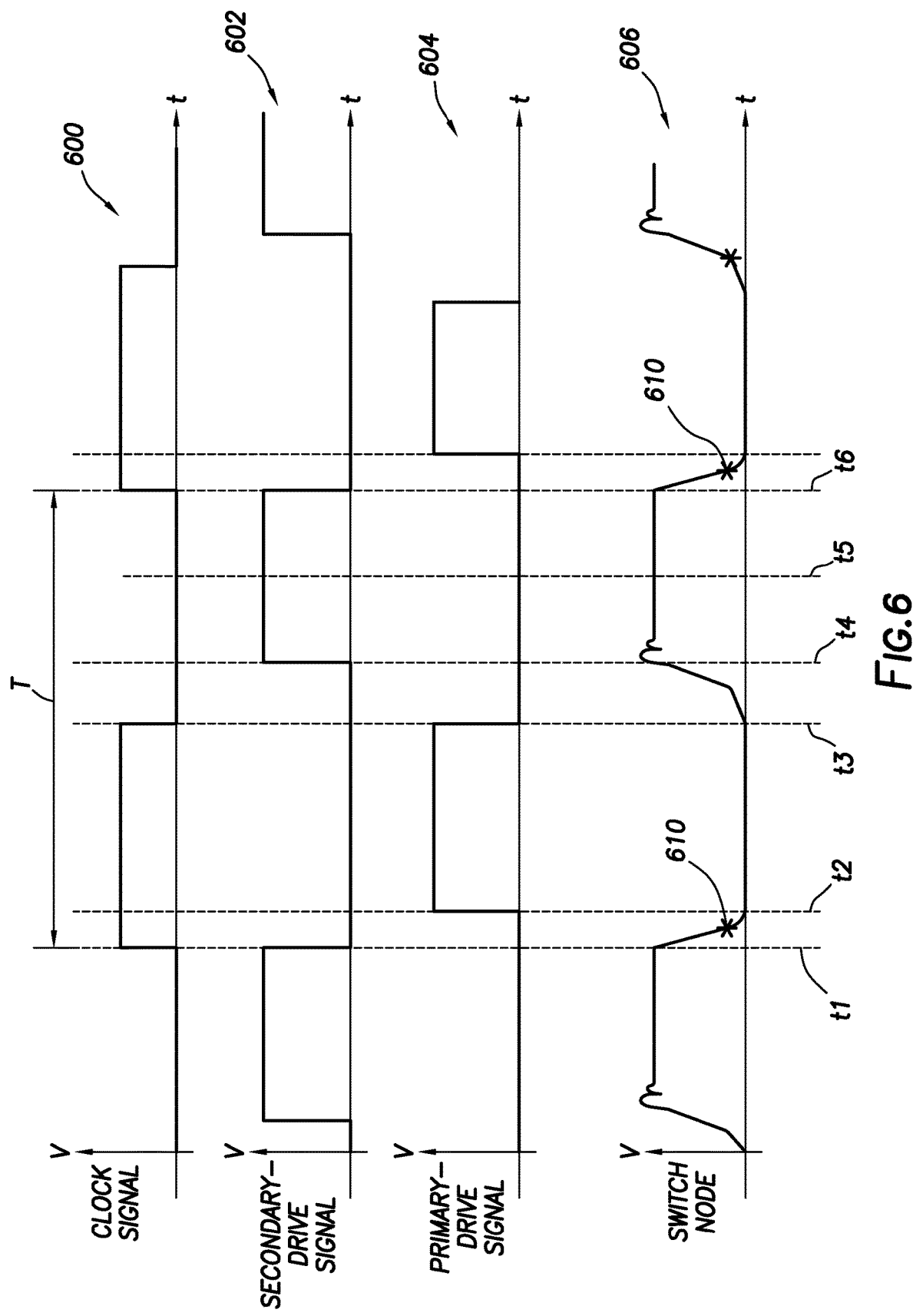
FIG. 6 shows a timing diagram in accordance with at least some embodiments.

FIG. 6 shows an example timing diagram. In particular, plot 600 shows a clock signal as a function of time, plot 602 shows a secondary FET gate-drive signal ("secondary-drive signal" in the figure) as a function of time, plot 604 shows a primary FET gate-drive signal ("primary-drive signal" in the figure) as a function of time, and plot 606 shows switch node voltage as a function of time. The various plots 600-606 are shown stacked so that the time axis corresponds in each plot.

Referring simultaneously to FIGS. 5 and 6. Consider first the time t1 within FIG. 6. Prior to time t1 the secondary-drive signal has been asserted (here, asserted high), and the voltage on the switch node 112 is falling. Though not shown in FIG. 6, consider that just prior to time t1 negative current flows in the secondary winding (e.g., FIG. 2C). At time t1 the clock signal is asserted (here, asserted high), and responsive thereto the secondary controller 528 deactivates the secondary-drive signal, making the secondary FET 126 nonconductive. As soon as the secondary FET 126 is made non-conductive at time t1 the voltage at the switch node 112 begins to decrease more quickly.

The primary controller 524 is designed and constructed to attempt to assert the primary-gate terminal 512, and thus make the primary FET 114 conductive, at a ZVS point. ZVS occurs after the parasitic capacitance (illustrated in FIG. 5 as capacitor 200) has been discharged. In the example timing diagrams of FIG. 6, the parasitic capacitance is discharged and the primary FET 114 becomes conductive at time t2, as shown by the primary-drive signal in plot 604 going asserted (here, asserted high).

However, the time window for ZVS switching is small, sometimes in the nanosecond range. Given propagation delays for signals within the controller 500, by the time a circuit directly detects the ZVS point, signal propagation delays within the controller 500 make difficult assertion of the primary-gate terminal 512 quickly enough to achieve ZVS. Thus, in some example embodiments the controller 500, and particularly the primary controller 524, does predictive ZVS. That is, in the time period between t1 and t2 the primary controller 524 senses the voltage on the switch node 112 (through the sense signal of voltage sense circuit 526). As the voltage on the switch node 112 falls through a predetermined voltage threshold 610 (e.g., 12 Volts), the primary controller 524 triggers the process to assert the primary-gate terminal 512, with the assertion actually occurring at the time t2 in FIG. 6. Stated differently, the primary controller 524 asserts the primary-gate terminal 512 responsive to the sense signal on the sense input 556 falling through a predetermined voltage threshold that is non-zero, and where the predetermined voltage threshold indicates that a ZVS condition will occur thereafter.

Once the primary-gate terminal 512 is asserted (at time t2), thus making the primary FET 114 conductive, the power converter 100 enters the charge mode (e.g., FIG. 2A). In the example timing diagram, the primary-drive signal of plot 604 is asserted between time t2 and time t3, and the charge mode ends on the example falling edge of the clock signal. As soon as the primary FET 114 is made non-conductive, the example power converter 100 enters the discharge mode (e.g., FIGS. 2B, 2C, and 2D).

In example systems, the secondary FET 126 is made conductive a finite amount of time after the primary FET 114 is made non-conductive. That is, in some cases the example secondary controller 528 is designed and constructed to assert the secondary-gate terminal 520 a predetermined amount of time (e.g., the time between t3 and t4) after the clock signal is de-asserted. In other cases, the secondary controller 528 may monitor, by way the drain-sense terminal 518, the drain of the secondary FET 126 and make the secondary FET 126 conductive responsive to the secondary FET 126 becoming forward biased, as discussed above. Further as shown in the timing diagram of FIG. 6, in various examples the secondary controller 528 makes the secondary FET 126 non-conductive responsive to the rising edge of the clock signal. And as discussed in reference to the transition to the charge mode occurring at time t2, responsive to the assertion of the clock signal the primary controller 524 monitors the sense signal created by the voltage sense circuit 526, and begins the process of making the primary FET 114 conductive again when switch node 112 voltage falls through the predetermined voltage threshold 610 after time t6.

Still referring to FIGS. 5 and 6, in example systems the modulation controller 542 also monitors in a first switching period (e.g., between times t1 and t6) the sense signal by way of its sense input 546. The modulation controller 542 regulates the clock period T (or clock frequency being the inverse of the clock period) in a future switching period (e.g., the immediately subsequent switching period) by modulating or changing the modulate signal driven to the modulate output 548 of the oscillator 530. In steady-state conditions (e.g., steady-state load, and constant input voltage VIN), the modulation controller 542 achieves or closely achieves ZVS of the primary FET 114. More particularly, the modulation controller 542 controls the clock period T to regulate the negative current flow to achieve sufficient negative current to implement ZVS of the primary FET 114. For example, the modulation controller 542 increases the frequency of the clock signal (i.e., shortens the clock period T) if the sense signal indicates excess negative current (detecting excess negative current is discussed more below). In the continued example, the modulation controller 542 increases the frequency of the clock signal in each cycle by an amount proportional to the excess negative current. In other cases, the modulation controller 542 increases the frequency of the clock signal in each cycle by a predetermined amount. Oppositely, the modulation controller 542 decreases the clock frequency (i.e., increases the clock period T) if the sense signal indicates insufficient negative current (detecting excess negative current is discussed more below). In some example systems, modulation controller 542 decreases the frequency of the clock signal by an amount proportional to the insufficient negative current. In other cases, the modulation controller 542 decreases the frequency of the clock signal by a predetermined amount.

Before turning to examples of regulation of the negative current, it is noted that the various examples achieve creating sufficient negative current to implement ZVS of the primary FET 114 in steady-state conditions; however, in non-steady-state conditions, such as when the load is changing or the input voltage VIN is not steady, ZVS may not occur on each and every activation of the primary FET 114. However, with each perturbation of the amount of negative current, the controller 500 works toward once again regulating negative current to achieve ZVS of the primary FET 114.

Returning to FIG. 5, regulating the negative current in accordance with various examples is based on the timing of the voltage on the switch node 112, as measured by the controller 500, and in one example by the reference timer 562 and the maximum timer 570. In particular, the reference timer 562 defines a trigger input 564 coupled to the clock signal, a reset input 566 coupled to the primary-gate terminal 512, and a timer output 568. The maximum timer 570 defines a trigger input 572 coupled to the clock signal, a reset input 574 coupled to the primary-gate terminal 512, and a timer output 576.

The example timers 562 and 570 couple to the modulation controller 542 to enable the modulation controller 542 to regulate the negative current. In particular, the modulation controller 542 defines a first timer input 578 coupled to the timer output 568, and a second timer input 580 coupled to the timer output 576. The example modulation controller 542 is configured to increase the clock frequency of the oscillator 530 if the signal indicative of negative current (e.g., the sense signal) falls below a predetermined voltage threshold (e.g., predetermined voltage threshold 610 (FIG. 6)) prior to assertion of the timer output 568 of the reference timer 562. Relatedly, in various examples the modulation controller 542 is configured to decrease the clock frequency of the oscillator 530 if the signal indicative of negative current (e.g., the sense signal) falls below the predetermined voltage threshold (e.g., predetermined voltage threshold 610 (FIG. 6)) after assertion of the timer output 568 of the reference timer 562. Further, the example modulation controller 542 is configured to make a non-linear change to the clock frequency of the oscillator 530 if the signal indicative of negative current does not fall below the predetermined voltage threshold prior to assertion of the timer output 576 of the maximum timer 570.

Figure 7:
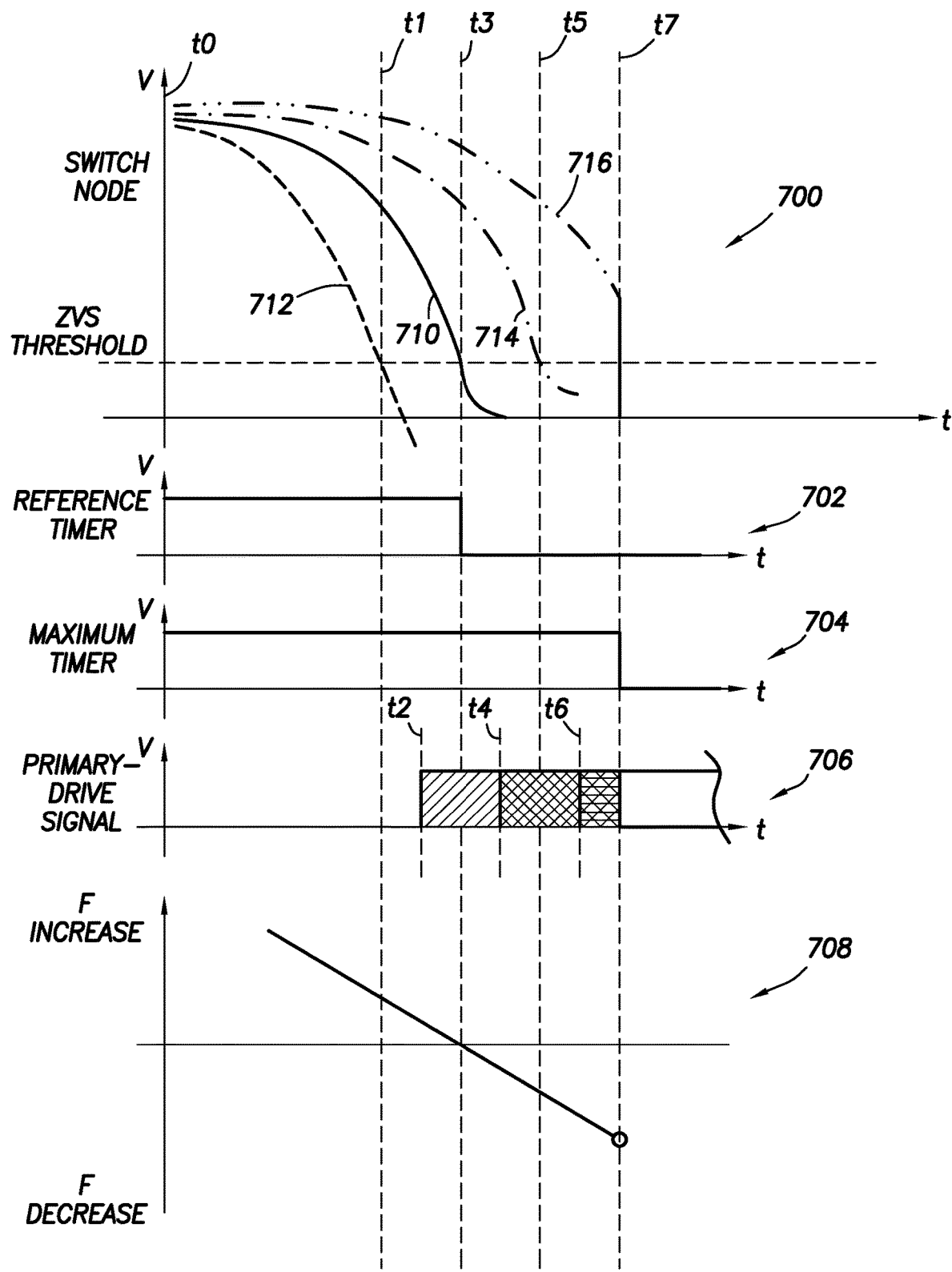
FIG. 7 shows a timing diagram in accordance with at least some embodiments.

FIG. 7 shows a timing diagram in accordance with at least some embodiments. In particular, plot 700 shows a set of co-plotted voltages on the switch node 112 as a function of time, plot 702 shows the timer output signal of the reference timer 562 (FIG. 5) as a function of time, plot 704 shows the timer output signal of the maximum timer 570 (FIG. 5) as a function of time, plot 706 shows the primary-drive signal on the primary-gate terminal 512 as a function of time, and plot 708 shows an example relationship of an amount of change of clock frequency against timing of the voltage on the switch node falling through the predetermined voltage threshold (shown as "ZVS Threshold" in FIG. 7).

Referring simultaneously to FIGS. 5 and 7, and particularly plot 700. Plot 700 shows four example switch node 112 voltages that may be sensed by the controller 500 as a function of time. The solid line 710 shows switch node voltage falling as a function of time, and crossing the ZVS threshold at time t3. For purposes of explanation, consider that the case of switch node voltage represented by solid line 710 is the ideal situation for achieving ZVS of the primary FET 114. Stated slightly differently, the case of switch node voltage represented by solid line 710 represents a situation where the clock frequency enables precisely the correct amount of negative current in the secondary winding to cause negative current in the primary winding to enable ZVS of the primary FET 114. In example systems, the reference timer 562 produces the timer output signal shown by plot 702. The timer starts based on assertion of the clock signal (not shown) at t0, and the timer expires at time t3. A finite amount of time after the switch node voltage crosses or falls through the ZVS threshold the primary-drive signal is asserted (at time t4). Thus, in the example situation the switch node voltage crosses or falls through the ZVS threshold contemporaneously with expiration of the reference timer (e.g., within a predefined window of time centered at the expiration of the reference time), and referring to plot 708, the modulation controller 542 makes no change to the clock frequency.

Now consider the plot 700 again, and particularly dashed line 712. For purposes of explanation, consider that the case of switch node voltage represented by dashed line 712 is a situation where the negative current is too high (i.e., there is excess negative current). Because the primary controller 524 asserts primary-gate terminal 512 a finite amount of time (e.g., due to propagation delay) after the switch node voltage falls through the ZVS threshold, when the negative current is too high the primary FET 114 is likely not switched at the ZVS point, and likely the primary FET 114 is switched with a negative voltage across the primary FET 114 and its body diode 506 conducting. Stated slightly differently, the case of switch node voltage represented by dashed line 712 is a situation where the clock frequency results in switching of the primary FET 114 too late to achieve ZVS. As before, the reference timer 562 produces the timer output signal shown by plot 702. The timer starts based on assertion of the clock signal (not shown) at t0, and the timer expires at time t3. Because the switch node voltage crossed or fell through the ZVS threshold at time t1, the primary controller 524 asserts the primary-gate terminal 512 a finite time later (at time t2). Thus, in the example situation the switch node voltage crosses or falls through the ZVS threshold prior to expiration of the reference timer, and referring to plot 708 the modulation controller 542 increases the frequency based on or proportional to how early the ZVS threshold was crossed relative to the expiration of the reference timer at time t3.

Now consider the plot 700 again, and particularly dash-dot-dash line 714. For purposes of explanation, consider that the case of switch node voltage represented by dash-dot-dash line 714 is a situation where the negative current is too low (i.e., there is insufficient negative current). Because the primary controller 524 asserts the primary-gate terminal 512 a set amount of time after the switch node voltage falls through the ZVS threshold, when the negative current is too low the primary FET 114 is likely not switched at the zero-volt switch point, and likely the primary FET 114 is switched with a positive voltage across the FET (i.e., the parasitic capacitance represented by capacitor 200 not fully discharged). Stated slightly differently, the case of switch node voltage represented by dash-dot-dash line 714 is a situation where the clock frequency results switching of the primary FET 114 too early to achieve ZVS. As before, the reference timer 562 produces the timer output signal shown by plot 702. The timer starts based on assertion of the clock signal (not shown) at t0, and the timer expires at time t3. Because the switch node voltage crossed or fell through the ZVS threshold at time t5, the primary controller 524 asserts the primary-gate terminal 512 a finite time later (at time t6). Thus, in the example situation the switch node voltage crosses or falls through the ZVS threshold after expiration of the reference timer, and referring to plot 708 the modulation controller 542 decreases the frequency based on or proportional to how late the ZVS threshold was crossed relative to the expiration of the reference timer at time t3.

Now consider the plot 700 again, and particularly dash-dot-dot-dash line 716. For purposes of explanation, consider that the case of switch node voltage represented by dash-dot-dot-dash line 716 is a situation where the negative current is also too low (i.e., there is insufficient negative current) such that the ZVS threshold is not crossed. In this situation, the modulation controller 542 forces the primary FET 114 to be conductive at time t7 regardless of the voltage across the primary FET 114. Stated slightly differently, the case of switch node voltage represented by dash-dot-dot-dash line 716 is a situation where the clock frequency is so far askew that to maintain output voltage the controller 500 forces the primary circuit 102 back into charge mode. The maximum timer 570 controls this case, and produces the timer output signal shown by plot 704. The maximum timer 570 starts based on assertion of the clock signal (not shown) at t0, and the maximum timer expires at time t7. Because switch node voltage failed to cross the ZVS threshold by time t7, the primary controller 524 asserts primary-gate terminal 512. The primary controller 524 may know to assert the primary-gate terminal 512 at time t7 in any suitable way. For example, the primary controller 524 may assert the primary-gate terminal 512 a predetermined amount of time after assertion of the clock signal in the absence of the sense signal falling below the ZVS threshold. In other cases, the timer signal generated by the maximum timer 570 may be supplied to the primary controller 524 (the electrical connection not specifically shown), and the primary controller 524 may assert the primary-gate terminal 512 responsive to the de-assertion of the maximum timer signal at time t7. Referring to plot 708, in the situation where the switch node voltage fails to cross the ZVS threshold, the modulation controller 542 makes a non-linear change to the clock frequency.

The various embodiments discussed with respect to FIG. 7 make changes to the clock frequency based on how long before or after the switch node voltage falls through the ZVS threshold relative to the reference timer 562. However, other parameters may be used to control an amount the clock frequency is changed. Returning to FIG. 5, as previously discussed, in some cases the voltage sense circuit 526 couples to the node between the primary FET 114 and the sense resistor 116. During periods of time when the primary FET 114 is conducting, the voltage on the sense resistor is indicative of current flow through the primary FET 114. During periods of time when the primary FET 114 is non-conductive and the body diode 506 is reversed biased by the voltage on the switch node 112, the voltage on the sense resistor 116 is effectively ground or common. However, during periods of time when there is negative current in the primary circuit 102, once the parasitic capacitance represented by capacitor 200 is discharged, the negative voltage on the switch node 112 can forward bias the body diode 506, thus resulting in small negative voltages on the sense resistor 116. In accordance with alternative embodiments, in addition to or in place of making changes to the clock frequency proportional to how long before or after the switch node voltage falls through the ZVS threshold relative to the reference timer 562, the further example systems modulate based on voltage sensed on the sense resistor 116. For example, the modulation controller 542 may make changes to the clock frequency based on the peak negative voltage sensed at the sense resistor 116 (with negative voltage indicative of the body diode 506 of the primary FET 114 being forward biased). If the peak negative voltage is too high, the modulation controller 542 increases the frequency. If the peak negative voltage is too low (or the voltage fails to go negative), the modulation controller 542 decreases the frequency.

Figure 8:
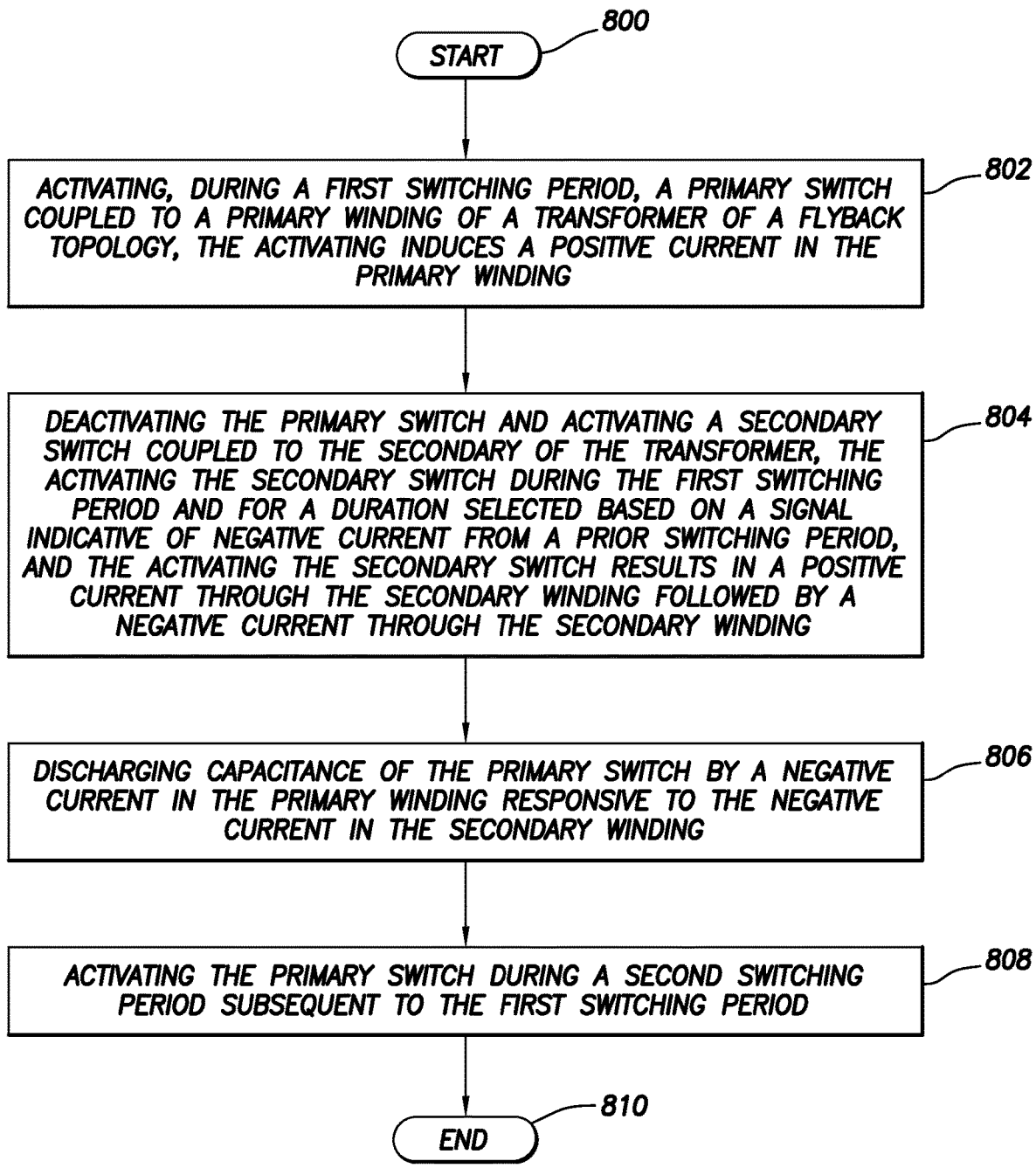
FIG. 8 shows a method in accordance with at least some embodiments.

FIG. 8 shows a method in accordance with at least some embodiments. In particular, the method starts (block 800) and comprises: activating, during a first switching period, a primary switch coupled to a primary winding of a transformer of a flyback topology, the activating induces a positive current in the primary winding (block 802); deactivating the primary switch and activating a secondary switch coupled to the secondary of the transformer, the activating the secondary switch during the first switching period and for a duration selected based on a signal indicative of negative current from a prior switching period, and the activating the secondary switch results in a positive current through the secondary winding followed by a negative current through the secondary winding (block 804); discharging capacitance of the primary switch by a negative current in the primary winding responsive to the negative current in the secondary winding (block 806); and activating the primary switch during a second switching period subsequent to the first switching period (block 808). Thereafter the method ends (block 810), likely to be repeated in a subsequent switching period.

Many of the electrical connections in the drawings are shown as direct couplings having no intervening devices, but not expressly stated as such in the description above. Nevertheless, this paragraph shall serve as antecedent basis in the claims for referencing any electrical connection as "directly coupled" for electrical connections shown in the drawing with no intervening device(s).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:
1. A method of operation a switching power converter, comprising:
    activating, during a first switching period, a primary switch coupled to a primary winding of a transformer of a flyback topology, the activating induces a positive current in the primary winding;
    deactivating the primary switch and activating a secondary switch coupled to a secondary winding of the transformer, the activating the secondary switch during the first switching period and for a duration selected based on a signal indicative of negative current from a prior switching period, and the activating the secondary switch results in a positive current through the secondary winding followed by a negative current through the secondary winding;
    discharging capacitance of the primary switch by a negative current in the primary winding responsive to the negative current in the secondary winding; and then
    activating the primary switch during a second switching period subsequent to the first switching period,
    wherein the first switching period begins after the prior switching period ends.
2. The method of claim 1 wherein the duration is shorter than a prior duration in the prior switching period if the signal indicative of negative current indicates an excess negative current.

3. The method of claim 2 wherein the duration of the first switching period being shorter than the prior duration results in increasing a switching frequency.

4. The method of claim 2 wherein the duration is shorter than the prior duration in the prior switching period by at least one selected from a group consisting of: an amount proportional to the excess negative current; and a predetermined amount.

5. The method of claim 1 wherein the duration is longer than a prior duration in the prior switching period if the signal indicative of negative current indicates an insufficient negative current.

6. The method of claim 1 further comprising, during the activation of the secondary switch, flowing positive current in the primary winding only through a diode to a clamp capacitor, the positive current in the primary winding during the activation of the secondary switch attributable to leakage inductance of the transformer.

7. The method of claim 1 wherein the signal indicative of negative current is at least one selected from a group consisting of: a voltage of a switch node between the primary winding and the primary switch; and a voltage of a monitor node between the secondary winding and the secondary switch.

8. A controller for a switching power converter, the controller comprising:
a primary-drive terminal, a secondary-drive terminal, a sense terminal, and a feedback terminal;
a primary controller coupled to the primary-drive terminal and the feedback terminal, the primary controller configured to assert the primary-drive terminal in a charge mode of a first switching period;
a secondary controller coupled to the secondary-drive terminal, the secondary controller configured to assert the secondary-drive terminal during a discharge mode in the first switching period;
a modulation controller configured to:
sense a signal indicative of negative current flow by way of the sense terminal during the first switching period; and
adjust a duration of assertion of the secondary-drive terminal during a second switching period subsequent to the first switching period, the adjustment responsive to the signal indicative of negative current flow during the first switching period,
wherein the second switching period begins after the first switching period ends.

9. The controller of claim 8 wherein when the modulation controller adjusts the duration of assertion, the modulation controller is further configured to make the duration of assertion shorter than a duration of assertion during the first switching period if the signal indicative of negative current flow indicates an excess negative current.

10. The controller of claim 9 wherein the duration of assertion during the second switching period being shorter than the duration of assertion during the first switching period results in increasing a switching frequency.

11. The controller of claim 8 wherein when the modulation controller adjusts the duration of assertion, the modulation controller is further configured to make the duration of assertion longer than a duration of assertion during the first switching period if the signal indicative of negative current flow indicates an insufficient negative current.

12. The controller of claim 11 wherein the duration of assertion during the second switching period being longer than the duration of assertion during the first switching period results in decreasing a switching frequency.

13. The controller of claim 8 wherein the controller does not control a clamp switch of a clamp circuit of the switching power converter.

14. A switching power converter comprising:
a primary circuit comprising:
a primary winding of a transformer, the primary winding having a first terminal coupled to an input node, and a second terminal defining a switch node;
a primary field effect transistor (primary FET) coupled between the switch node and a ground or common of the primary circuit;
a clamp diode in series with a clamp capacitor, the clamp diode and clamp capacitor coupled between the input node and the switch node;
a secondary circuit comprising:
a secondary winding of the transformer arranged for flyback operation; and
a secondary FET coupled between a terminal of the secondary winding and ground or common of the secondary circuit;
a controller defining a main drive output coupled to a gate of the primary FET, a second drive output coupled to a gate of the secondary FET, and a sense input coupled to a signal indicative of voltage at the switch node;
the controller is configured to:
assert a gate of the primary FET during a charge mode of a first switching period; and then
assert a gate of the secondary FET during a discharge mode of the first switching period;
sense a signal indicative of negative current flow by way of the sense input during the first switching period; and
adjust a duration of assertion of the gate of the secondary FET during a discharge mode of a second switching period subsequent to the first switching period, the adjustment responsive to the signal indicative of negative current flow during the first switching period,
wherein the second switching period begins after the first switching period ends.

15. The switching power converter of claim 14 wherein when the controller adjusts the duration of assertion, the controller is further configured to make the duration of assertion shorter than a duration of assertion during the first switching period if the signal indicative of negative current flow indicates an excess negative current.

16. The switching power converter of claim 15 wherein the duration of assertion during the second switching period being shorter than the duration of assertion during the first switching period results in increasing a switching frequency.

17. The switching power converter of claim 14 wherein when the controller adjusts the duration of assertion, the controller is further configured to make the duration of assertion longer than a duration of assertion during the first switching period if the signal indicative of negative current flow indicates an insufficient negative current.

18. The switching power converter of claim 17 wherein the duration of assertion during the second switching period being longer than the duration of assertion during the first switching period results in decreasing a switching frequency.

19. The switching power converter of claim 17 wherein the controller makes the duration of assertion during the second switching period longer by at least one selected from a group consisting of: an amount proportional to the insufficient negative current; and a predetermined amount.

20. The switching power converter of claim 14 wherein the controller does not control a clamp switch of a clamp circuit of the switching power converter.

* * * * *